United States Patent [19]

Boyd et al.

[11] Patent Number: 5,024,770
[45] Date of Patent: Jun. 18, 1991

[54] WASTE SEPARATING, PROCESSING AND RECYCLING SYSTEM

[75] Inventors: John A. Boyd, Arlington, Va.; George M. Staples, III, Salisbury, Md.

[73] Assignee: American Materials Recycling Inc., Arlington, Va.

[21] Appl. No.: 219,275

[22] Filed: Jul. 15, 1988

[51] Int. Cl.⁵ .................. B02C 11/08; B02C 21/00; B02C 23/08

[52] U.S. Cl. ...................... 210/747; 209/13; 209/930; 210/770; 210/805; 210/806; 241/16; 241/21; 241/23; 241/24; 405/129

[58] Field of Search .................. 210/170, 195.1, 747, 210/751, 768, 770, 774, 805, 806, 808, 902, 919, 920; 209/12, 13, 17, 919, 930; 241/DIG. 38, 24, 38, 43, 20, 23, 21, 16, 17; 405/129, 128

[56] References Cited

U.S. PATENT DOCUMENTS

| | | | |
|---|---|---|---|
| 3,405,873 | 10/1968 | Gothard et al. | 241/183 |
| 3,638,590 | 2/1972 | Roberts et al. | 210/768 |
| 3,679,142 | 7/1972 | Gothard | 241/183 |
| 3,802,631 | 4/1974 | Boyd | 241/24 |
| 3,817,458 | 6/1974 | Gilberto | 241/24 |
| 4,050,388 | 9/1977 | Boyd | 110/257 |
| 4,157,961 | 6/1979 | Borst | 210/768 |
| 4,168,232 | 9/1979 | Allen et al. | 210/512.1 |
| 4,308,809 | 1/1982 | Woods | 110/346 |
| 4,350,597 | 9/1982 | Selm et al. | 210/751 |
| 4,368,120 | 1/1983 | Martone et al. | 210/170 |
| 4,452,548 | 6/1984 | Balogh et al. | 210/170 |
| 4,624,417 | 11/1986 | Gangi | 241/DIG. 38 |
| 4,657,681 | 4/1987 | Hughes et al. | 210/769 |
| 4,750,437 | 6/1988 | Rouse | 110/346 |
| 4,778,116 | 10/1988 | Mayberry | 241/DIG. 38 |
| 4,815,668 | 3/1989 | Frei | 241/24 |
| 4,818,405 | 4/1989 | Vroom et al. | 210/774 |
| 4,844,813 | 7/1989 | Helfgott et al. | 210/747 |

Primary Examiner—Frank Spear
Assistant Examiner—Joseph Drodge

[57] ABSTRACT

An apparatus and process for separating waste material requiring use of ground water for processing in a wet mill a drum separator in combination with purification and recycling, routing recycled water to a biomonitoring fish pond and use of a system wash water for washing for processing in a wet mill sanitizing of refuse collection vehicles. The groundwater is obtained from an aquifer underlying and containing leachate from a landfill, thereby solving environment problems.

7 Claims, 5 Drawing Sheets 5,024,770

WASTE SEPARATING, PROCESSING AND RECYCLING SYSTEM

BACKGROUND OF THE INVENTION

Improper attempts at disposal of municipal solid waste through the years has aggravated the problem of contamination of the ground, of the air and most seriously the ground water in and around unlined existing landfills. This pollution includes contaminants that are known causes of cancer. In many communities this contamination has resulted in the condemnation of a community's drinking water source. Other communities now utilizing massburn incineration as their principal means of refuse disposal have been cited by the EPA for harmful emissions containing cancer-causing dioxions and furions. Fallout from contaminated hazardous incinerator ash (containing hazardous household wastes, metals, plastics and glass) has also been cited as a danger to community health.

It has also been proven by the Federal government that this fallout is also evident many miles down wind from the massburn incinerator emitting invisible toxic fumes (acid rain or incinerator fallout). The safe operation of massburn incinerators is also dependent upon an auxiliary fuel (principally natural gas) to burn fumes generated by burning unprocessed solid waste. This causes a dangerous air pollution climactic change that scientists attribute to a problem known as a "warming trend of the ozone layer".

Nationwide the trend in all communities has been to transport bulk unprocessed municipal solid waste to remote landfills or to a central disposal means. This inefficient transport of refuse has resulted in highway congestion and excessive exhaust pollution resulting in damage to vegetation along the route. It has also contributed significantly to the escalation of tax demands found necessary to support the runaway refuse disposal costs.

SUMMARY OF THE INVENTION

Additional objectives of this invention are to provide a logical solution to solid waste disposal by removing the causes of pollution included in the solid waste stream.

A further objective of this improved invention is to remove, neutralize and dispose of hazardous household wastes from the refuse stream before it contaminates the waste stream and the environment.

Another objective of this improvement invention is to further process and dispose of the biodegradable pulverized soluble wastes that are separated and discharged from the drum separator.

Still another objective of this improved invention is to recover, reuse, treat and to monitor landfill groundwater or leachate from beneath existing or abandoned landfills. This major environmental problem affects virtually every community in the nation! Rainwater seeps through unlined landfills. It contaminates groundwater, which supplies a large percentage of the nation's drinking water.

This invention recycles aquifer water, treats and uses it in processing new solid wastes. Recycled water is stored in a living biomonitor pond, which utilizes live fish to monitor quality of water.

A further objective of this improved invention is to provide the community with an economical, pollution-free, totally enclosed, aesthetic processing facility, said facility being close to the point of refuse generation, where refuse volume would be reduced to a minimum of 60% and where refuse trucks would be washed before returning to the streets for additional collection in nearby neighborhoods. The water used to sanitize the collection trucks is recycled to the processing water system.

DESCRIPTION OF THE PREFERRED EMBODIMENTS

A known form of refuse treatment apparatus and method for separating waste material such as disclosed in U.S. Pat. Nos. 3,802,631, issued Apr. 9, 1974, and 4,050,388, issued Sept. 27, 1977, and discussed in U.S. Pat. Nos. 3,405,873, issued Oct. 15, 1968, and 3,679,142, issued to Sidney Gothard July 25, 1972, are improved by providing a pollution-free network means of facilities within a community that are totally enclosed and operate under negative pressure. Such facilities are strategically located to decrease collection and disposal costs while relieving traffic congestion and budget requirement.

The improvement provides an economical means for the control of household hazardous wastes in a waste stream to minimize health and safety hazards and to assure lower recovered material products quality. This control is assisted by Citizen Source Separation which includes a plastic "red bag" hazardous waste disposal option for non-technically educated persons.

Improvement is by the recovery, collection, treatment and use of landfill ground water or leachate and using said ground water or leachate as the wetting agent in a drum separator. The leachate and/or process water treatment used in this improvement relies heavily on the ability of this invention to treat the landfills and/or its wastewaters effectively when needed and at a reasonably low cost. The discharge is passed through a biomonitoring fish culture pond. A facility for retreatment is provided and effluents are held up to verify discharge quality by sampling and analysis before discharge.

The improvement provides an overall materials recovery process designed to provide flexibility in refuse processing and to produce saleable material for a minimum cost while producing the highest possible quality. The recovery process consists of two distinct interchangeable product lines from the soluble waste line emerging from a drum separator. The product lines are AG Products (agricultural products) and CRDF (clean refuse derived fuel).

CRDF is produced by directing the soluble biodegradable pulverized solid waste containing the wetting agent consisting of leachate and/or ground water and emerging from the drum separator through a controlled heat drum drier apparatus utilizing waste heat from a high temperature closed loop furnace being fueled by the same processed pulverized solid waste (CRDF).

AG products are processed by directing pulverized refuse emerging from the drum separator including the treated leachate water recycled from landfill ground water through an aerobic digestion stage. The combined adjustment of "seed", nutrients, moisture content and porosity (density) determine the type of AG product that is produced for a particular market. The biodegradable product may be seeded with a 10% mixture of stabilized solid waste product processed in a drum separator using ground water, contaminated water or leachate as a softening agent. After the "product" has been analyzed (essential to cost effective digestion where toxicity conditions arise from some uncontrollable incoming contaminant), blending or diversion to CRDF must be used.

A further improvement is providing a furnace system that utilizes CRDF (a powdered fuel) as the source of fuel. The fuel is blown into the furnace through a jet, propelled by preheated forced air and controlled by a series of forced fresh air jets producing a high temperature of 2500° F., made possible by the purity of the CRDF.

The prior apparatus and methods are improved by providing a high temperature furnace that directs a portion of its generated heat to a drum-drying means to dry the wet processed solid waste emerging from the drum pulverizing separator and containing recycled leachate and/or groundwater. This completes a directed loop within the process because the same dried CRDF is the source of heat that is used to dry the CRDF in the drum drier.

This invention provides an expandable municipal solid waste disposal system that expands with the community. Expansion simply adds an additional drum separator within a totally enclosed controlled air enclosure while guarding the environment against pollution hazards.

BRIEF DESCRIPTION OF THE DRAWINGS

Referring now to the drawings, which form a part of the original disclosure.

Figure 4:
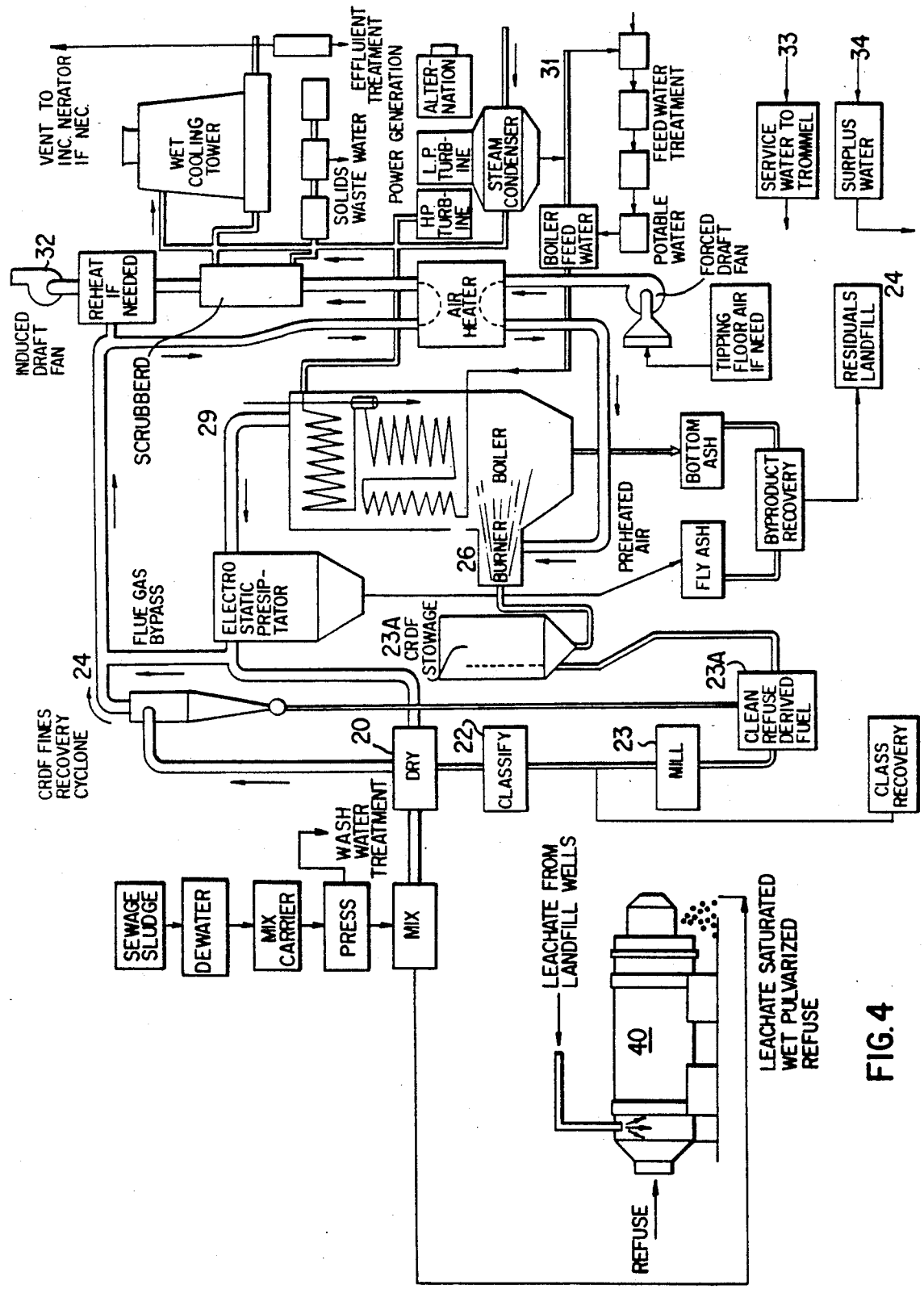
FIG. 4 is a diagrammatic flow chart of a closed loop boiler system as it pertains to the generation of pollution-free energy while providing the means of drying the media that becomes the source of fuel to generate the energy.

Referring now to the drawings in further detail, there is shown in FIG. 4 a rotatable drum generally designated 40 which is used for processing refuse material feeding into the inlet thereof. The drum and the entire interior thereof is made in accordance with aforesaid U.S. Pat. Nos. 3,405,873 and 3,679,142, the entire disclosures of which are hereby incorporated by reference. Fresh water is the normal wetting fluid injected into the drum to soften the refuse being processed within the drum. This improvement assists in a solution to a long standing national health problem with ground water that has passed through a landfill. Rainwater that falls on a landfill becomes contaminated water called leachate. This toxic water eventually penetrates the underground fresh water aquifer and pollutes in many cases the community's only source of drinking water. By using this contaminated ground water instead of the fresh water 12, this source of pollution would be economically controlled at a minimum cost to the community.

Figure 1A:
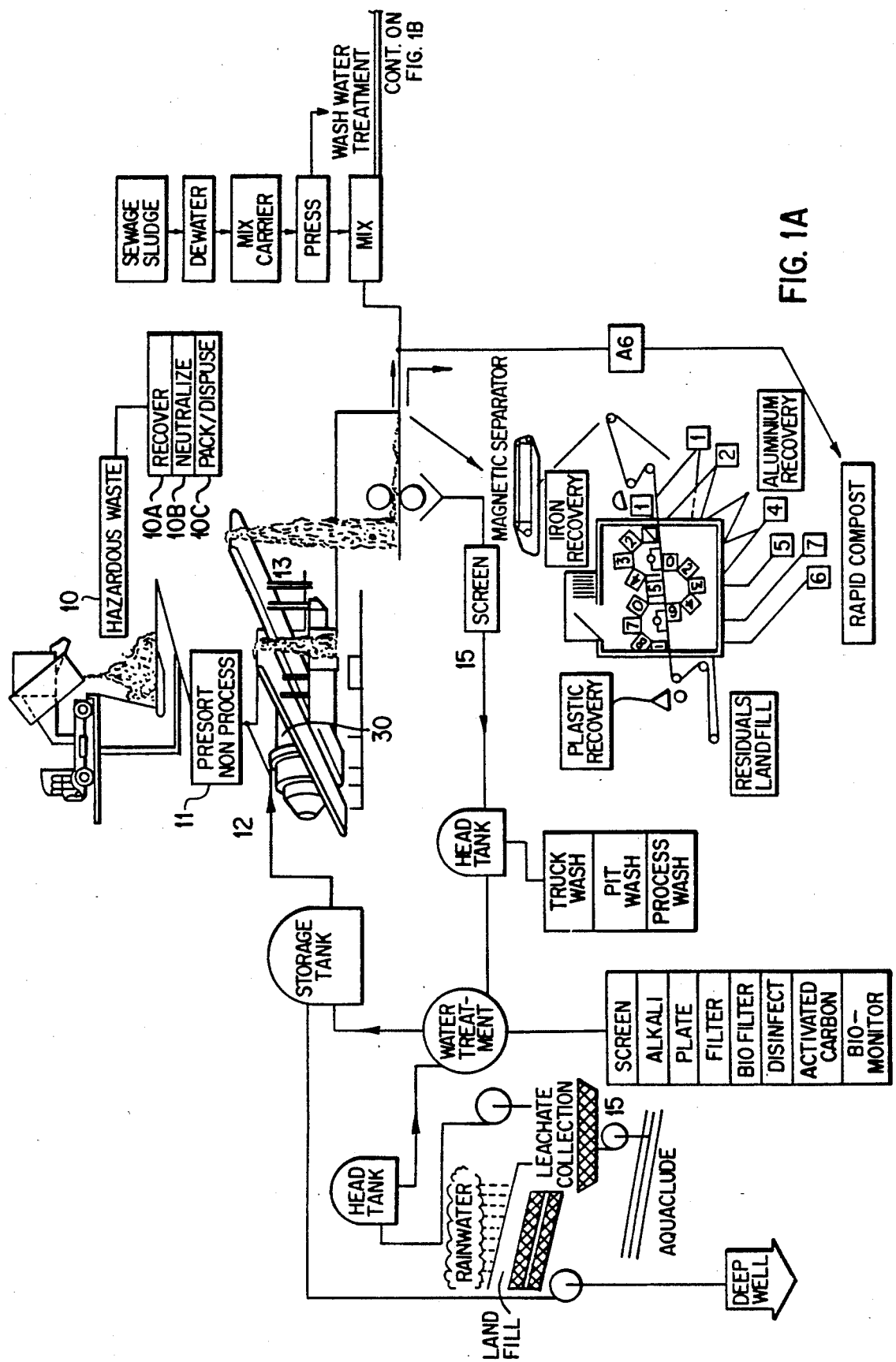
FIG. 1A and 1B are a diagrammatic view of an improved refuse treatment apparatus in accordance with the principles of my invention.
Figure 1B:
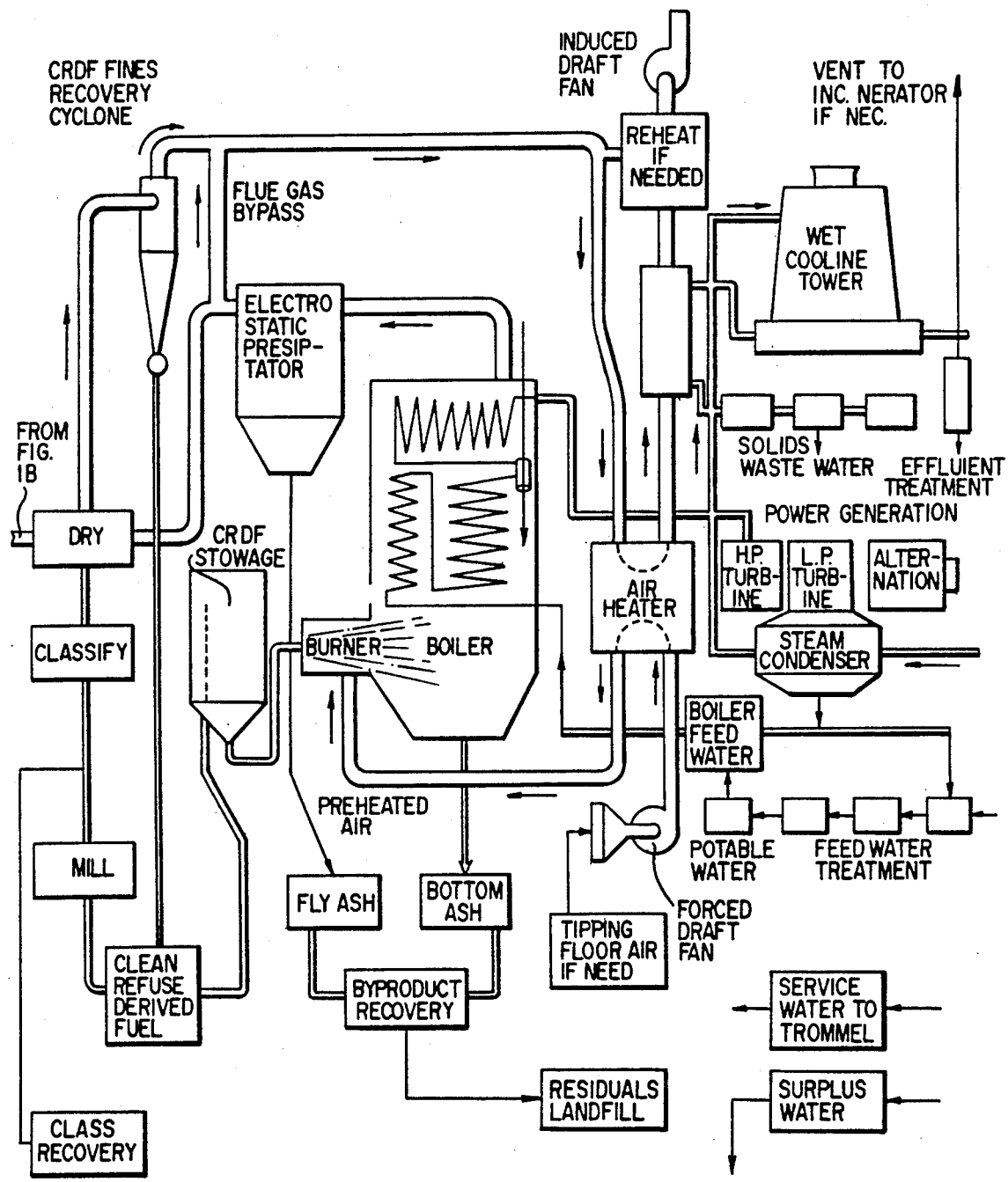
Figure 2:
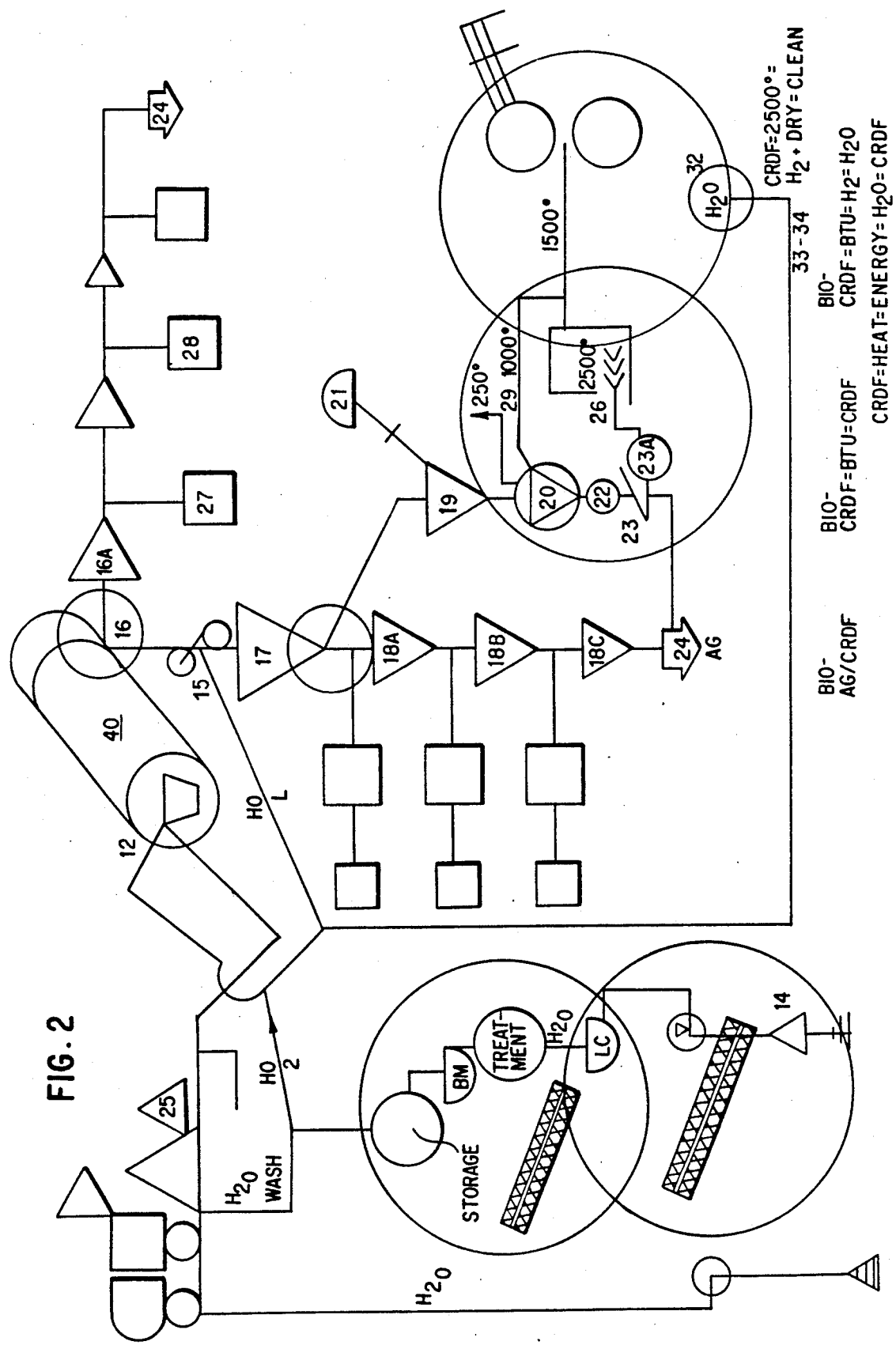
FIG. 2 is a diagrammatic perspective view of the optional form of treatment apparatus which can be used in the course of processing the pulverized or soluble refuse material.
Figure 3:
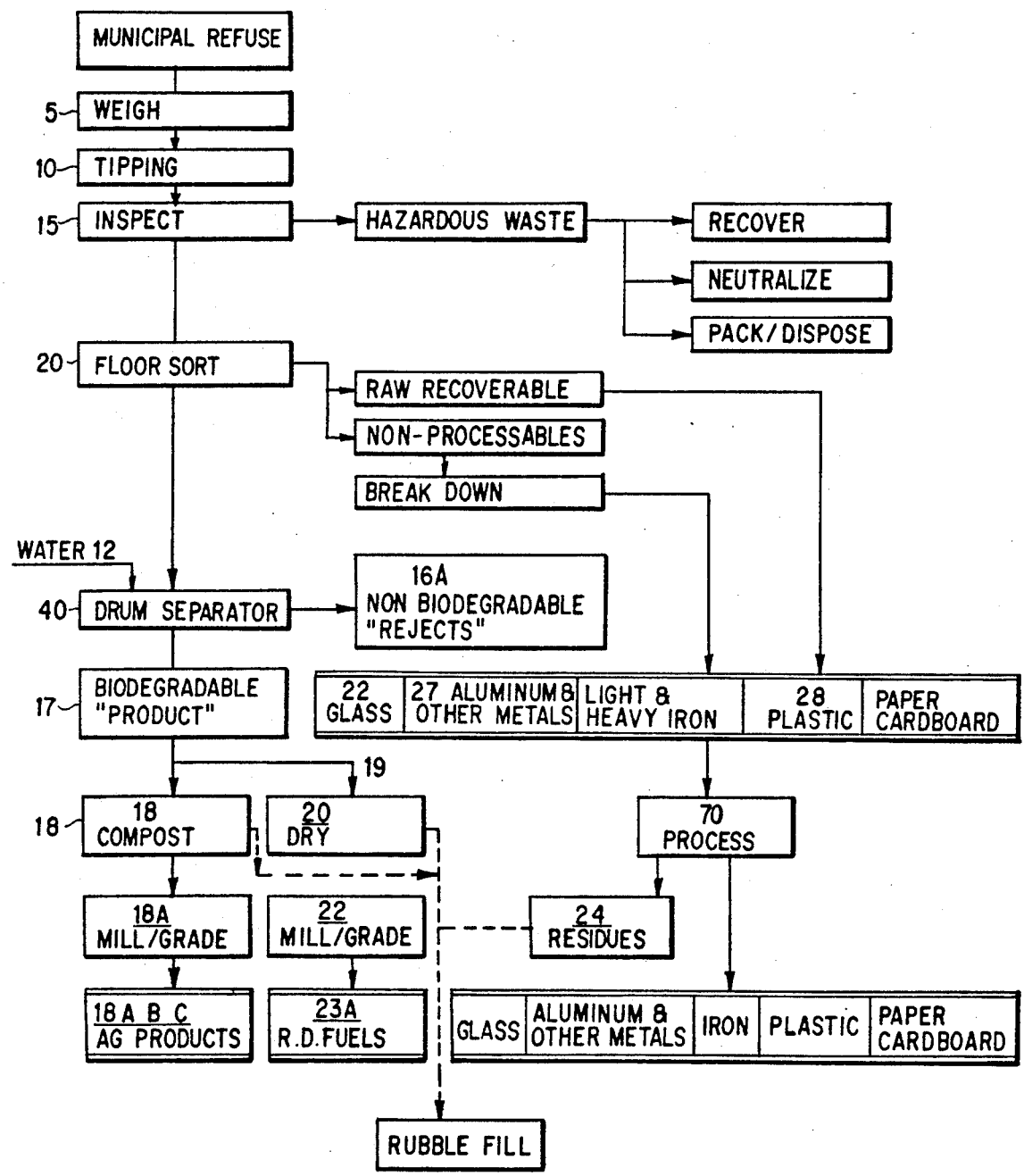
FIG. 3 is a flow diagram in block form showing the present invention and the stages which can be used in the course of processing the non-pulverized refuse material.

The diagrammatic layout of the water recovery and treatment system is shown in FIG. 3. All water used in the facility of FIG. 2, item 12 would be recycled and used in the drum separator to soften and pulverize new incoming refuse.

Water treatment is simultaneously accomplished on water pumped from the aquifer 14 and water removed 15 from the processed pulverized refuse product.

It is evident that product production flexibility 17 is necessary to economically operate a resource recovery facility successfully and to reduce the waste stream volume to a maximum. Product processing flexibility assures the maximum profit potential through saleable products dictated by consumer demand.

AG Products 24 produce the greatest profit from the biodegradables included in solid waste when compared to CRDF (clean refuse derived fuel) 19.

Referring to FIG. 3, a flow chart indicating product production after passing through the drum separator 40 includes the AG product 18-A process line. These include rapid composting 18-B and milling processes 18-C to specification plus grading to size. Should the market dictate that CRDF 19 sell better in a particular season or time, production to line 18A would be possible. This process includes hot air drum 20 which achieves drying 21 and milling 22 of sewage sludge 22 to specification plus grading 23 to size.

The residules 24 would be landfilled at an appropriate non-putrescible site. The residules from the entire facility would represent a 90-95% volume reduction after processing. Another major environmental problem common to municipalities is sewage sludge disposal. Referring to FIG. 3, this improvement to the aforementioned patent processes will further facilitate pollution-free disposal of sludge and thus enhance a healthier community because of improved environmental conditions.

Item 25, the presort recovery of household hazardous waste is another improvement to the foregoing patents. Positive identification and recovery of this type of waste is absolutely necessary as it is a peril to the environment of the community. This is the only positive means available to accomplish this important task. Attention is called to the pulverized refuse 16 material emerging from the product outlet near the end of the drum and processed into CRDF 19 in the steps indicated in FIG. 2, item S 19,20,21,22,23. This product can be burned in a high temperature furnace system 26 as shown intercoupled with the complete system in FIG. 2. In aforementioned U.S. Pat. No. 4,050,388, the pulverized refuse emerging from a drum as discussed in aforementioned U.S. Pat. No. 3,679,142 was used in production of AG Products 18 and not burned in the furnace 26. In contrast, this improvement to that patent utilizes this same pulverized product 16 as CRDF 19 for fuel in a high temperature furnace 26. This fuel is different than other RDF which has been tried in many cogeneration plants in that it is free from contaminating glass 22, plastics 28, and metals 27. (These three contaminating products are one of the prime causes for furnace failure and air pollution in existing generating facilities and massburn incinerators.) This CRDF 23A is granular and is fed into the furnace combined with forced air much the same as powdered coal. FIG. 4 is a flow diagram of a closed loop 29 furnace that could be one of many standard commercial furnaces on the market today. The unique feature of this system is that the CRDF 23A is free of contaminating substances 22,27,28 that produce excessive hazardous ash and require a large combustion chamber. The furnace described in this improvement can be fired at high temperatures because of the wholesomeness of the fuel. The temperature of the furnace is controlled by the volume of air that is preheated and mixed with the volatile granular fuel. A controlled exhaust 29 passes through an electrostatic precipitator FIG. 2, item 30. A portion of the exhaust is then directed to controlled heat drum rotating drier apparatus 20 The drum drier 20 can be a conventional device such as a sand drier but the temperature must be controlled because of the volatility of the product when dried to excess. The damp (20-25%) pulverized refuse 18 is mixed with dewatered sewage sludge which is also 20-25% damp and directed to the controlled heat rotating drum drier 20. The dried product is conveyed to a trommel classifier 22 where glass and foreign substances are removed. After milling to specification 23, the CRDF is conveyed to stowage 3A ready to be used as fuel in the high temperature furnace. The loop within the system consists of drying and utilizing pulverized refuse with leachate and/or water or ground water 19, drying 20, processing 22,23, storing 23A, burning 26 and return to the drying means 20 and thus process water is recycled in a closed loop which is more completely shown in FIG. 2. This is the same separated soluble product as discussed in aforementioned U.S. Pat. No. 3,802,631 with the improvement of using recycled ground water discussed in FIG. 3, and using generated heat made from the same pulverized product as mentioned in U.S. Pat. No. 3,802,631, dried by means of a recycling loop system in a high temperature furnace with the capability of producing pollution-free high temperature steam 31, as mentioned in U.S. Pat. No. 4,050,388 from pollution-free CRDF 23A and recycled leachate and/or groundwater and/or water 12 and venting the exhaust from the furnace means, generating energy without emitting contaminating vapors from burning CRDF that is free from plastics, metals and glass 22,27,28 and exhausting clean 250° F. air through an induced draft mean 32.

The service water 33 and surplus water 34 from the steam generating means 31 is recycled to the separating drum 40 and reused to process incoming presorted solid waste.

What is claimed is:

1. A method for pulverizing and separating municipal solid waste into its component parts comprising: collecting and pre-sorting municipal solid waste, processing and separating the pre-sorted waste in a wet mill rotary separator means into soluble, biodegradable material and non-soluble, non-biodegradable material, pumping and injecting groundwater from an aquifer beneath a landfill into said wet mill separator, said aquifer comprising a mixture of groundwater and untreated leachate from said landfill, wherein said groundwater is utilized in process steps of softening and pulverizing the biodegradable material and utilizing two separate conveyor means to remove both the softened, pulverized biodegradable material and the non-biodegradable material to further processing.

2. The method of claim 1, further comprising; further processing of the separated biodegradable material into agricultural (AG) products and clean refuse derived fuel (CRDF) including the steps of processing the biodegradable material through dewatering rolls and through a closed loop furnace boiler wherein process heat and waste heat that are generated are recycled to the boiler and wherein waste collecting vehicle wash water, process sanitation wash water and water generated in the step of dewatering roll processing are each recycled to the rotary separator means.

3. The method of claim 2, further comprising treating of said groundwater and said recycled water by the process steps of screening, adding alkali, passing through a plate filter, biofilter and activated charcoal filter, treating by adding disinfectant and subsequent storing of said treated water in a biomonitoring pond stocked with live fish which will react immediately to any change in water quality.

4. The method of claim 1, further comprising: further processing of the separated biodegradable material into agricultural (AG) products and clean refuse derived fuel (CFDF), said products being produced in process steps including; dewatering, screening windrowing, and blending of biodegradable material with compost seed.

5. The method of claim 4, wherein the processing of material into clean refuse derived fuel includes the process steps of treatment in a closed loop furnace boiler which utilizes recycled waste heat, and classification to remove glass, metals, and plastics from the fuel.

6. The method according to claim 5, wherein the processing material into clean refuse derived fuel further comprises passage of material through a dry trommel classifier means to remove glass and foreign substances.

7. The method of claim 1, wherein the presorting of the waste includes means to separate household hazardous waste from waste to be processed comprising household storage of such hazardous wastes in pre-designated plastic bags.

* * * * *